L. R. HIBBERT.
SIGNAL.
APPLICATION FILED SEPT. 27, 1917.
1,281,957.
Patented Oct. 15, 1918.
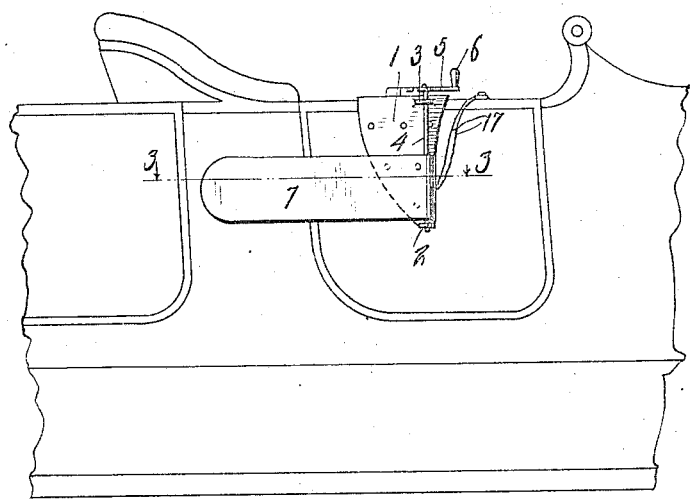
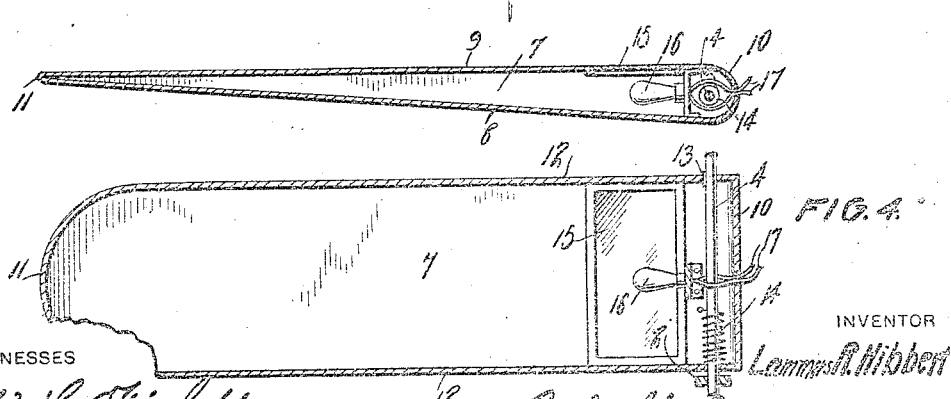
WITNESSES
INVENTOR
Lemmas R. Hibbert
ATTORNEY

UNITED STATES PATENT OFFICE.

LAMMERS R. HIBBERT, OF CANUTILLO, TEXAS.

SIGNAL.

1,281,957.

Specification of Letters Patent.

Patented Oct. 15, 1918.

Application filed September 27, 1917. Serial No. 193,537.

*To all whom it may concern:*

Be it known that I, LAMMERS R. HIBBERT, a citizen of the United States, residing at Canutillo, in the county of El Paso and State of Texas, have invented certain new and useful Improvements in Signals, of which the following is a specification.

This invention relates to signaling devices and more particularly to a signal for automobiles, the primary object being to provide a means for indicating to drivers of other vehicles the direction and movement of the automobile so that the common expedient of extending the arm of the driver from the vehicle will be unnecessary. One of the objects of the invention is to provide a signaling arm of this character that will be mounted on the side of the automobile in a manner that will permit it to be easily extended into operative position or to be swung into inoperative position; the device being so mounted as to permit its operation even when the top of the vehicle is up or storm curtains are in position.

A further object of this invention is the provision of an automobile signaling device which consists of comparatively few parts and is simple and durable in construction, and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which:—

Figure 1 is a fragmentary side elevation of an automobile showing the device mounted thereon.

Fig. 2 is a top plan view.

Fig. 3 is a section taken on the line 3—3 of Fig. 1.

Fig. 4 is a vertical longitudinal section through the signaling arm.

Referring to the drawing wherein is illustrated the preferred form of my invention and in which like characters of reference indicate corresponding parts throughout the several views, the bracket 1 is in the form of a plate which is secured by screws or other suitable fastening elements to the side of the automobile body. The upper edge of this plate has a flange which overlaps the top edge of the sides of the body of the vehicle which, in the present instance is shown as the forward door of the vehicle. This plate, as shown in Fig. 1 of the drawing, is substantially of triangular formation and its lower end has a laterally projecting ear 2 while a similar ear 3 is arranged near the upper edge of the plate. These ears have openings which are in vertical alinement for the reception of a hinge pin 4 the upper end of which carries a lever 5 having a handle 6 attached for the purpose of manually rotating the rod 4 or hinge pin.

A signal arm 7 is constructed from light metal or any other suitable material and is of hollow construction and includes the front wall 8 and the rear wall 9. These walls are preferably constructed from an elongated strip of suitable material bent intermediate their ends to provide the rounded end wall 10 and from this point the walls converge to a sharp edge 11 at the opposite end of the arm. This provides a tapered space within the arm and the rod or pin 4 extends through the widest end of the same and through openings in the top and bottom walls 12. This permits the arm to swing with the arm 4 when the handle 6 is manipulated. A key 13 or other suitable fastening element is employed to secure the arm to the rod so that the arm will rotate with the rod. Coiled about the rod near the lower end thereof is a spring 14 which has one end secured to one wall of the arm and the opposite end fastened to the rod 4. This spring is of the expansible type and tends to exert a pressure on the arm to maintain it in inoperative position that is swung over to engage the side of the car body as indicated in Figs. 1 and 2 of the drawing.

The wall 9 of the arm is provided with a rectangular opening in which a panel of glass 15 is set and a transverse bracket within the arm carries a light 16 in the form of an electric lamp having connection with a suitable source of current carried by the car or automobile. The electrical conductors 17 are extended from the light to the source of current for the purpose of illuminating the light at night whereby the arm may be visible when the vehicle is traveling in the night time.

To operate the device it is merely necessary to grasp the handle 6 and swing the arm outwardly to extended position against the tension of the spring 14. When the operator releases his hold of the handle 6 the spring will operate to swing the arm back to engage the body of the automobile as shown in Fig. 2 of the drawing.

From the foregoing it will be observed that a very simple and durable signaling device has been provided the details of which embody the preferred form of my invention. I desire it to be understood, however, that slight changes in the minor details of construction may be made without departing from the spirit of the invention or the scope of the claim hereunto appended.

Claim.

A signaling device of the class described comprising a signal arm of hollow construction and including front and rear walls formed of an elongated strip of material bent intermediate its ends to provide a rounded end wall, the said front and rear walls converging from the said rounded end walls to a sharp edge at the opposite end of the signal arm whereby a tapered space is provided within the arm, a rod extended vertically through the said rounded end of the arm for supporting the arm to permit swinging movement thereof, and an illuminating element mounted within the said rounded end of the arm and disposed centrally therein, one of the said walls having a glass panel whereby the said illuminating element will be visible from the exterior of the said arm when the same is swung to operative position, a vehicle and means mounted on the vehicle and engaged with the said rod to permit the said glass panel and the corresponding walls to swing into engagement with the vehicle whereby the said light rays will not be visible.

In testimony whereof I affix my signature in presence of two witnesses.

LAMMERS R. HIBBERT.

Witnesses:
 FRANCIS J. BIERMANN,
 J. P. HILDMAN.